Aug. 3, 1965    R. W. PARKER    3,197,842
METHOD OF MAKING BALL JOINTS
Filed Feb. 5, 1962
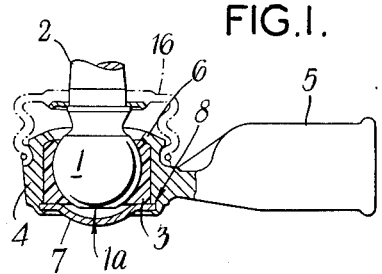
FIG.I.
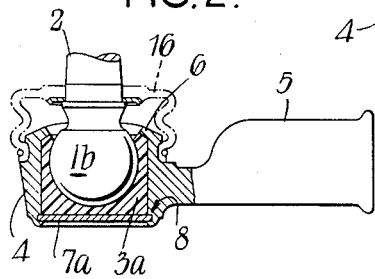
FIG.2.
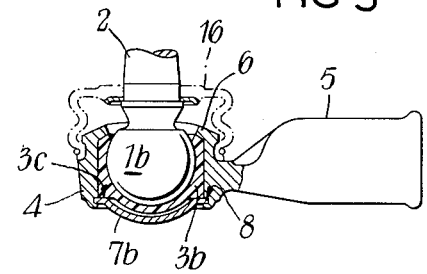
FIG 3
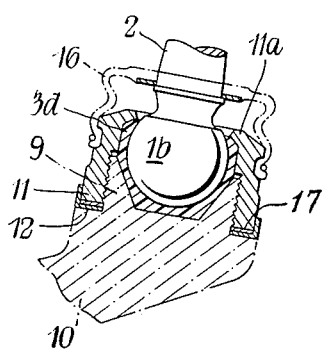
FIG.4.
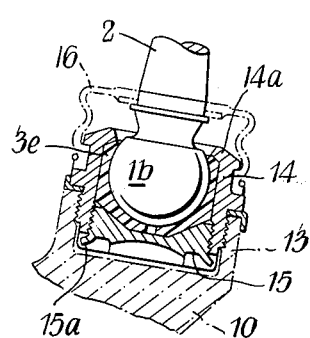
FIG.5.

United States Patent Office 3,197,842
Patented Aug. 3, 1965

3,197,842
METHOD OF MAKING BALL JOINTS
Robert William Parker, Clevedon, Somerset, England, assignor to Engineering Productions (Clevedon) Limited, Clevedon, Somerset, England, a British company
Filed Feb. 5, 1962, Ser. No. 170,956
9 Claims. (Cl. 29—149.5)

This invention relates to a method of making ball joints of the type incorporating a ball element mounted to swivel in an outer housing having an open mouth through which a pin on the ball element projects.

A main object of the invention is to provide a highly efficient method of making a ball joint of the aforementioned type which requires a minimum of joint parts and is both simple and relatively inexpensive to manufacture.

Accordingly, the invention provides a method of making a ball joint of the type specified wherein a socket, made of nylon, polypropylene or other synthetic plastic material having low friction and good wearing characteristics, is moulded around the ball element before the latter is entered into the outer housing and the said housing is made in separable parts which are secured together around the assembled ball element and encasing socket.

According to a further aspect, the invention provides a ball joint of the type specified wherein a socket, made of nylon, polypropylene or other synthetic plastic material having low friction and good wearing characteristics, is moulded around the ball element and the socketed element is press fitted into the housing to provide pre-loading in the joint.

In order that the invention may be clearly understood and readily carried into effect, a number of embodiments thereof will now be described in detail with reference to the accompanying drawings, in which:

FIGURE 1 is a part-sectional side elevation showing one form of ball joint constructed in accordance with the invention, part of the ball stud being broken away, FIGURE 2 is a view similar to FIGURE 1 but shows an alternative form of ball joint, FIGURE 3 is a view similar to FIGURES 1 and 2 but shows yet another form of ball joint, FIGURE 4 is a part-sectional elevation showing another form of ball joint of the invention in operative position on one end of a stub axle carrier, the carrier and ball joint stud being partially broken away and the carrier being shown in chain dotted lines, and FIGURE 5 is a view similar to FIGURE 4 but shows yet another form of ball joint of the invention.

Throughout the drawings the same reference numerals will be employed to identify like parts.

Referring now to FIGURES 1 to 3, the ball joints illustrated therein are intended for use in the steering rod assembly of a motor vehicle. In FIGURE 1, the ball joint incorporates a ball element 1 which is formed on one end of a ball pin 2 and may have a flattened section 1a remote from the pin. Moulded closely around the ball element is a socket 3 having a mouth at one end, through which the ball pin 2 projects, and having a somewhat smaller aperture at the opposite end through which the flattened section 1a of the ball element projects. The socket 3 is made from nylon, polypropylene or other synthetic material having low friction and good wearing properties, and has a generally cylindrical outer wall surface with a flat end remote from the mouth.

To complete the ball joint, a two-part housing is provided, the first part of which is conveniently constituted by a collar 4 formed integrally on one end of a steering rod part 5. The internal surface of this collar may be made cylindrical and one end opening is reduced, by an overhanging shoulder 6, to form a mouth. The collar 4 is internally dimensioned so that the ball element 1 and encasing socket 3 can be pressed, ball pin first, through the opposite end of the housing collar part until the socket mouth abuts the aforesaid overhanging shoulder 6 and the pin 2 projects beyond the housing mouth. The rim of the housing mouth as well as the rim of the socket mouth are preferably made to diverge outwardly in order to leave ample clearance for rocking movements of the ball pin.

The second part of the housing is constituted by a closure member in the form of a disc or plate 7 which has an outwardly dished centre portion, opposite the flat section 1a of the ball element, and a flat annular rim which seats on a shoulder 8 formed within the end of the collar part 4 opposite the mouth of the latter and also bears on the socket end remote from the mouth. This disc or plate 7 is then secured to the collar part by peening or rolling over the adjoining rim of the latter around the disc or plate edge and serves to maintain the socket pressed against the collar shoulder 6.

Before the disc or plate is assembled in position, grease or other lubricant may be packed between the dished part of the disc or plate and the exposed flattened section of the ball element.

In the modified ball joint shown in FIGURE 2 the end of ball element 1b remote from the pin is rounded and the socket part 3a has a closed flattened end remote from the mouth. The second part of the housing then conveniently consists of a flat disc or plate 7a which is entered into the collar part of the housing 4 behind the socket so as to bear against the closed flat end of the latter as well as against the internal collar shoulder 8. Apart from the foregoing minor constructional differences, the joint of FIGURE 2 is similar to the joint of FIGURE 1, and is assembled and functions in the same way.

In the third embodiment of the invention shown in FIGURE 3, the ball element 1b again has a rounded end remote from the ball pin and the socket part 3b is provided with a part-spherical end, remote from the socket mouth, the external surface of which merges, by way of a radial shoulder 3c into the outer socket wall surface. The second part of the housing in this further embodiment takes the form of a disc or plate 7b having an annular rim with a centre dished portion to accommodate the part-spherical end of the socket. Such disc or plate 7b is again entered into the end of the collar part of the housing remote from the mouth so as to bear against the internal collar shoulder 8 as well as against the radial shoulder 3c around the socket end. A narrow clearance space may be left between the part-spherical socket end and the plate 7b. Again this third embodiment, apart from the minor constructional differences mentioned, is similar to the joint of FIGURE 1 and is assembled and functions in the same way.

In the embodiments shown in FIGURES 4 and 5, the ball joints illustrated are applied to a vehicle front wheel suspension assembly. In FIGURE 4, the joint incorporates a ball element 1b formed on the end of a ball pin 2 and having a socket 3d of synthetic plastic material moulded closely therearound. This socket may, however, have a somewhat modified external configuration as shown in that the end of the socket remote from the mouth thereof is made flat and from this flattened end the external wall surface of the socket diverges outwardly over approximately half the socket depth, continues in substantially cylindrical form until just short of the socket mouth and then converges inwardly.

To accommodate the ball and socket assembly, a two-part outer housing is again provided, consisting of a closure member in the form of a plug part 9, provided by an internally hollowed and externally screw-threaded cylindrical extension on a stub axle carrier 10, and an outer collar or ring part 11 which has a mouth at one end defined by an inwardly projecting shoulder 11a and is arranged to screw on to the plug part. The ring part 11 is retained in position on the plug part by a tab washer 12. The assembly of ball element and socket is, of course, pressed into the hollow plug part 9 before the outer collar part is applied, and the latter is then engaged over the element and socket and secured to the plug part as aforesaid so that the socket is held between the plug part and the shoulder 11a on the collar part.

To accommodate the ball pin, the mouth rim of the housing ring, which registers with the socket mouth through which the ball pin projects is outwardly tapered. The internal wall surfaces of the ring and plug parts of the housing are shaped to correspond with the external configuration of the socket so that, when the ring part is screwed home, a pre-load or additional pre-load may be applied to the socket. One or more shims 17 may be inserted between the tab washer 12 and the ring part 11, to assist in controlling the preload. If desired, a space for grease or lubricant can be provided between the aforesaid housing parts.

In the embodiment shown in FIGURE 5, the stub axle carrier 10 only indirectly forms part of the joint housing and to this end is provided with an internally screw-threaded hollowed extension 13. The ball joint again has a ball element 1b formed with a pin 2 and encased in a socket of synthetic plastic material 3e which is moulded closely around the element 1b. To house the ball element and socket, there is provided a main housing consisting of a collar part 14 and a plug part 15. This collar part has a mouth at one end defined by the outwardly divergent inner rim of an inturned shoulder 14a and, at the opposite end, is externally screw-threaded to engage in the cylindrical extension 13. The collar part 14 is also screw-threaded internally at the end remote from the mouth adjustably to receive the closure plug 15 which has an inner end face shaped to conform with the outside surface of the inner socket end. The plug 15 is arranged to be locked when in position by bending over portions 15a of a rim on the plug into slots formed in the adjoining collar rim.

The ball joint shown in FIGURE 5 enables preloading to be varied by adjusting the screw plug and subsequently locking this plug in position as aforesaid. This joint also has the important advantage of being self-contained and can therefore be supplied ready for fitting to the suspension member of a vehicle or can be replaced as a whole.

In each of the embodiments described, a dust cover 16 will also normally be provided so that one end closely embraces the ball pin and the other the housing ring part.

With all the joint constructions described, it will be appreciated that, by suitable external shaping and dimensioning of the socket and internal shaping of the housing surface, which may be generally cylindrical as described or may diverge slightly towards the end remote from the housing mouth, it is possible to obtain varying degrees of axial and radial tightness of fit of the socket within its housing. The construction thus enables a pre-load to be provided which is sufficient to take up wear during use whereby the joint will remain free from hammer and back-lash during long working periods. In the case of the embodiment of FIGURE 5 this pre-loading provided by the socket shaping and dimensioning is, of course, in addition to the pre-loading provided by the adjustable plug.

In any of the joint constructions described above the socket may be made of any suitable thermoplastic synthetic material such as nylon, or polypropylene, any of the iso-cyonate condensation products, or may be made from a material incorporating P.T.F.E. or any suitable plastic fibre.

I claim:

1. A method of making a ball joint which comprises the steps of moulding a socket of synthetic plastic material having low friction and good wearing characteristics closely around a substantially spherical ball head on a stud, press-fitting said socketed ball head into an open-ended housing collar having one end inwardly shouldered to form a reduced mouth through which said stud is projected, and finally securing a closure member over the open end of said housing collar remote from the mouth to exert axial pressure on said socket and thereby maintain the latter pressed against said housing shoulder.

2. A method as claimed in claim 1 in which the socket end remote from the stud is moulded to form a flattened part against which said closure member is caused to bear.

3. A method as claimed in claim 2 in which said closure member is axially displaced when positioned on the housing collar to adjust pre-loading in the joint.

4. A method as claimed in claim 1 wherein said closure member is secured to the housing collar by screw threadingly engaging the member and collar.

5. A method as claimed in claim 3 wherein the collar is also screw threadedly engaged with a construction member with which the ball joint is adapted to be used.

6. A method of making a ball joint which comprises the steps of moulding a socket of synthetic plastic material having low friction and good wearing characteristics closely around a substantially spherical ball head on a stud, press-fitting said socketed ball element into an open-ended housing collar having one end inwardly shouldered to form a reduced mouth through which said stud is projected, screwing an externally-screw-threaded closure plug into the opposite open end of said housing collar, said opposite open collar end having complementary internal screw threads, to exert axial pressure on said socket, locking the screw-threaded plug in final position by bending over portions of a rim on said plug into slots formed in the adjoining collar rim, and finally screwing the collar, which also has external screw threads around the internally screw-threaded end thereof, into an internally screw-threaded hollow part of a stub axle carrier.

7. A method of making a ball joint as claimed in claim 6 in which the socket end remote from the stud has a substantially frusto-conical external configuration which seats in a complementary frusto-conical recess in the inner plug end.

8. A method of making a ball joint which comprises the steps of moulding a socket of synthetic plastic material having low friction and good wearing characteristics closely around a substantially spherical ball head on a stud, press-fitting said socketed ball element into an open-ended housing collar having one end inwardly shouldered to form a reduced mouth through which said stud is projected, screwing an externally screw-threaded closure plug into the opposite open end of said housing collar, said opposite open collar end having complementary internal screw threads, to exert axial pressure on said socket, forming external screw threads on the collar around the internally screw-threaded end of the collar, and locking the screw-threaded plug in final position by bending over portions of a rim on said plug into slots formed in the adjoining collar rim.

9. A method of making a ball joint which comprises the steps of moulding a socket of synthetic plastic material having low friction and good wearing characteristics closely around a substantially spherical ball head on a stud, forming an open-ended housing collar with one end inwardly shouldered to form a reduced mouth, forming screw threads on the interior of the collar at the opposite end of the collar, forming screw threads on the exterior of the collar around the interior screw threads, press-fitting the socketed ball head into the open-ended collar against the shoulder of the collar with the stud projecting through the reduced mouth, screwing an externally screw-threaded closure plug into the interior screw threads of the collar to exert axial pressure on the socketed ball head, and locking the plug in final position by bending over portions of a rim on said plug into slots formed in the adjoining collar rim.

References Cited by the Examiner

UNITED STATES PATENTS

| | | | |
|---|---|---|---|
| 1,175,288 | 3/16 | Patrick | 29—149.5 |
| 1,947,004 | 2/34 | Goddard et al. | 29—148.4 |
| 2,003,412 | 6/35 | Alden et al. | 29—149.5 |
| 2,252,351 | 8/41 | Paulus | 29—149.5 |
| 2,715,766 | 8/55 | Ricks | 29—441 |
| 2,823,055 | 2/58 | Booth | 287—90 |
| 2,855,665 | 10/58 | Alldredge | 29—441 |
| 2,934,365 | 4/60 | Moskovitz | 287—90 |
| 2,954,993 | 10/60 | Scheublein | 287—90 |
| 2,979,353 | 4/61 | Sellers | 287—85 |
| 3,067,596 | 12/62 | Caunt | 29—149.5 |

WHITMORE A. WILTZ, *Primary Examiner.*

WALTER A. SCHEEL, THOMAS H. EAGER,
*Examiners.*